US010151398B2

(12) United States Patent
Salvarani et al.

(10) Patent No.: US 10,151,398 B2
(45) Date of Patent: Dec. 11, 2018

(54) HOMOGENIZING VALVE FOR REMOVING FIBERS FROM FIBROUS FLUIDS (71) Applicant: GEA MECHANICAL EQUIPMENT ITALIA S.P.A., Parma (IT)

(72) Inventors: Luca Salvarani, Parma (IT); Silvia Grasselli, Parma (IT); Leonardo Maggi, Parma (IT)

(73) Assignee: GEA MECHANICAL EQUIPMENT ITALIA S.P.A., Parma (IT)

( * ) Notice: Subject to any disclaimer, the term of this patent is extended or adjusted under 35 U.S.C. 154(b) by 179 days.

(21) Appl. No.: 15/026,148

(22) PCT Filed: Jan. 28, 2014

(86) PCT No.: PCT/IB2014/058613
§ 371 (c)(1),
(2) Date: Mar. 30, 2016

(87) PCT Pub. No.: WO2015/059583
PCT Pub. Date: Apr. 30, 2015

(65) Prior Publication Data
US 2016/0245419 A1 Aug. 25, 2016

(30) Foreign Application Priority Data

Oct. 21, 2013 (IT) .............................. PR2013A0081

(51) Int. Cl.
*B01F 5/06* (2006.01)
*F16K 25/04* (2006.01)
*F16K 29/00* (2006.01)

(52) U.S. Cl.
CPC .............. *F16K 25/04* (2013.01); *B01F 5/068* (2013.01); *B01F 5/0663* (2013.01);
(Continued)

(58) Field of Classification Search
CPC .... B01F 5/0661; B01F 5/0681; B01F 5/0664; B01F 5/068; B01F 5/0665;
(Continued)

(56) References Cited

U.S. PATENT DOCUMENTS 1,018,591 A     2/1912  Sperry
4,352,573 A *  10/1982  Pandolfe .................. A01J 11/16
                                                            137/1
(Continued)

FOREIGN PATENT DOCUMENTS

DE      1959347           6/1971
EP      0507011  A1       10/1992
(Continued)

*Primary Examiner* — Charles Cooley
(74) *Attorney, Agent, or Firm* — Pearne & Gordon LLP (57) ABSTRACT Homogenizing valve (1) at high pressure, particularly for application to fibrous fluids, comprising: a valve body (2); a passage head (15) integrally joined to the valve body (2); an assembled organ (27) formed of two pistons (5, 6) and a striking head (16), which is axially mobile inside a through hole of the valve body (2), so that the striking head (16) defines with the passage head (15) an interspace (18) of passage of the fluid, the assembled organ (27) being rotatable thanks to the lower cogged profile which engages in a cogged tool (20).

9 Claims, 6 Drawing Sheets (52) U.S. Cl.
CPC .......... *B01F 5/0665* (2013.01); *B01F 5/0681* (2013.01); *F16K 29/00* (2013.01)

(58) Field of Classification Search
CPC ...... B01F 2215/0431; B01F 2215/0472; B01F 3/0807; B01F 2003/0849; B01F 2215/0468; B01F 2215/0006; A01J 11/16
USPC .............................. 137/803–842; 138/42–43; 366/176.1–176.4
See application file for complete search history.

(56) References Cited

U.S. PATENT DOCUMENTS

| | | | | |
|---|---|---|---|---|
| 4,585,357 | A * | 4/1986 | Ogata | B01F 5/068 251/121 |
| 5,749,650 | A * | 5/1998 | Kinney | B01F 5/0664 138/43 |
| 5,782,557 | A * | 7/1998 | Young | B01F 5/0665 366/176.2 |
| 5,887,971 | A * | 3/1999 | Gandini | B01F 5/0663 138/46 |
| 5,899,564 | A * | 5/1999 | Kinney | B01F 5/0679 138/43 |
| 6,234,206 | B1 * | 5/2001 | Malmberg | A01J 11/16 137/625.33 |
| 6,238,080 | B1 * | 5/2001 | Jarchau | B01F 5/0664 137/625.3 |
| 6,244,739 | B1 * | 6/2001 | Jarchau | B01F 5/0664 137/625.3 |
| 6,305,836 | B1 * | 10/2001 | Jarchau | B01F 5/0664 137/625.3 |
| 6,705,755 | B1 * | 3/2004 | Innings | B01F 5/0663 137/625.33 |
| 7,144,149 | B2 * | 12/2006 | Grandi | B01F 3/0807 137/601.01 |
| 8,066,425 | B2 * | 11/2011 | Boer | B01F 3/0807 138/43 |
| 8,585,277 | B2 * | 11/2013 | Grandi | B01F 5/0663 138/46 |
| 8,944,673 | B2 * | 2/2015 | Malmberg | A01J 11/16 138/43 |
| 9,199,208 | B2 * | 12/2015 | Malmberg | A01J 11/16 |
| 9,399,201 | B1 * | 7/2016 | Wu | B01F 15/00025 |
| 2004/0160855 | A1 * | 8/2004 | Rivolta | B01F 5/0665 366/176.2 |
| 2005/0083779 | A1 * | 4/2005 | Grandi | B01F 3/0807 366/176.1 |
| 2010/0296363 | A1 * | 11/2010 | Grandi | B01F 5/0663 366/176.3 |
| 2010/0329073 | A1 * | 12/2010 | Malmberg | A01J 11/16 366/176.3 |
| 2014/0177382 | A1 * | 6/2014 | Malmberg | A01J 11/16 366/176.2 |
| 2015/0173322 | A1 * | 6/2015 | Malmberg | A01J 11/16 426/519 |
| 2016/0245419 | A1 * | 8/2016 | Salvarani | B01F 5/0663 |
| 2017/0251684 | A1 * | 9/2017 | Grasselli | A23C 9/1216 |

FOREIGN PATENT DOCUMENTS

| | | | |
|---|---|---|---|
| EP | 0810025 A1 | 12/1997 | |
| EP | 1273340 A1 * | 1/2003 | ........... B01F 5/0664 |
| GB | 2121141 A | 12/1983 | |
| GB | 2407566 A * | 5/2005 | ........... B01F 5/0663 |
| IT | 1385953 | 10/2007 | |
| JP | 61-28429 * | 2/1986 | |
| RU | 94036295 A | 6/1996 | |
| RU | 2201795 C2 * | 4/2003 | ............. A01J 11/16 |
| WO | WO-9847606 A1 * | 10/1998 | ............. A01J 11/16 |
| WO | WO-0103818 A1 * | 1/2001 | ........... B01F 5/0664 |
| WO | WO-0103819 A1 * | 1/2001 | ........... B01F 5/0664 |
| WO | 2009053859 A1 | 4/2009 | |
| WO | WO-2012084986 A1 * | 6/2012 | ............. A01J 11/16 |

* cited by examiner

HOMOGENIZING VALVE FOR REMOVING FIBERS FROM FIBROUS FLUIDS

TECHNICAL FIELD

The present invention relates to a homogenising valve. In particular, the invention proposed here may be used in equipment for homogenising fluids, for example liquids with particles or agglomerates or fibres in suspension, i.e. substantially liquid products but subject to formation of solid portions or, in any case, portions of higher density.

STATE OF THE ART

As is well-known, apparatus for homogenising fluids crush the particles, reducing their dimensions to a minimum and make the dimensions of the particles uniform, thus reducing variation of distribution of the dimensions of the particles.

Said homogenising apparatus, also in the different embodiments so far known, comprise a high-pressure pump and a homogenising valve. The homogenising valve comprises a first chamber receiving the fluid at high pressure from the pump delivery and a second chamber capable of supplying outgoing homogenised fluid at low pressure. The homogenising action is obtained by forcing the fluid to pass through an interspace with reduced dimensions afforded between the first and the second chamber. The interspace is defined by a passage head integrally joined to the valve body and by a striking head axially mobile with respect to the passage head.

The fluid coming from the inlet presses on a surface of the striking head exerting on it a pressure which tends to widen the passage. A pusher capable of contrasting the pressure of the fluid in an axial direction is applied to the striking head. The dimension of the interspace of passage is controlled by acting directly on the pusher as a function of the valve flow rate and pressure operating values.

As already indicated above, in passage through the interspace, the fluid loses pressure and is simultaneously accelerated, thus allowing fragmentation of the particles in suspension.

In order to optimise the energy used in the homogenisation process, over recent years, the Applicant has developed homogenising valves in which the first and the second chamber have an annular shape. Said solutions are described in European patent EP810025 and in Italian patent no. 1385953 in the name of the Applicant.

The annular configuration of the two chambers allows the fluid at high pressure to press on an annular surface of the striking head, thus allowing operation with an interspace of reduced dimensions with respect to the known solutions, with the same energy applied.

The principal disadvantage of the solutions just described lies in the reduced useful lifetime of the components, particularly those subject to high pressure (e.g. striking head and passage head). In applications with fibrous fluids, the useful lifetime of components is further reduced by the abrasiveness of the fluids themselves, which means that the components exposed to transit of the fluids wear out more rapidly and must be replaced with greater frequency.

Besides homogenisation, removal of fibres from fibrous fluids (e.g. cellulose pulp) is traditionally performed with mills, disk or blade grinders, ultrasonic treatment or cold-pressing. However, said solutions are affected by various problems, such as:

- production yields which are too low or unsuited to the market;
- difficulties in pumping the fluid;
- lack of uniformity of the fluid treated;
- difficulties in crushing the fluid into particles in the order of nanometers.

In order to treat fibrous fluids (e.g. cellulose pulp) with a homogenising valve at high pressure of the known type, which potentially offers higher yields, it is necessary to operate with pressures of the order of 1500 bar, with high energy consumption, wear of components and therefore reduction of their useful lifetime.

OBJECT OF THE INVENTION

In this context, the object of the present invention is to propose a homogenising valve which overcomes the problems of the prior art cited above.

In particular, the object of the present invention is to propose a homogenising valve wherein the useful lifetime of the various components, for example the striking head and the passage head, is greater than the known solutions.

The object of the present invention is presenting a homogenising valve capable of removing fibres from fibrous fluids, such as cellulose pulp for example, reducing the energy used with the same yields on fibrous product and simultaneously reducing wear of the components.

In other words, the object of the present invention is presenting a homogenising valve which allows reduction of the energy spent with the same yield of fibrous product, thus increasing the flow rate treated by the homogeniser.

Another object of the present invention is proposing a homogenising valve which has easier maintenance with respect to the known solutions.

The technical task set and objects specified are substantially attained by a homogenising valve comprising the technical characteristics as set out in one or more of the claims.

BRIEF DESCRIPTION OF THE DRAWINGS

Further characteristics and advantages of the present invention will appear more clearly from the indicative, and therefore non-limiting, description of a preferred but not exclusive embodiment of a homogenising valve, as illustrated in the drawings, wherein.

DETAILED DESCRIPTION OF PREFERRED EMBODIMENTS OF THE INVENTION

With reference to the figures, number 1 denotes a homogenising valve. In particular, the homogenising valve proposed here is particularly suited for removal of fibres from fibrous fluids, such as cellulose pulp for example. The valve 1 comprises a valve body 2 defining a through hole with an axial development with respect to the valve body 2.

For example, the valve body 2 is formed of the assembly of at least two separate bodies, i.e. an inlet valve body 3 and an outlet valve body 4, which are axially aligned.

The valve 1 comprises a first piston 5 and a second piston 6, both housed in the through hole. Said pistons 5, 6 are integrally coupled. In particular, the first piston 5 is inserted into a first section of the through hole at the inlet valve body 3, whereas the second piston 6 is inserted in a second section of the through hole at the outlet valve body 4.

The valve 1 presents an inlet 7 for the fluid at high pressure and an outlet 8 for the homogenised fluid at low pressure. The inlet 7 is connectible to a high-pressure pump (not shown) which, together with the valve 1, constitutes a homogenisation apparatus.

Between the valve body 2 and the first piston 5, a first annular chamber 9 is afforded, to which the inlet 7 for fluid at high pressure relates.

Between the valve body 2 and the second piston 6, a second annular chamber 10 is afforded, to which the outlet 8 relates. In particular, the second annular chamber 10 transfers the homogenised fluid at low pressure to said outlet 8 of the valve 1.

In the embodiments described and shown here, the valve 1 comprises two further chambers 11, 12. In particular, there are envisaged:
  a third annular chamber 11 afforded between the valve body 2 and the first piston 5;
  a fourth annular chamber 12 afforded between the valve body 2 and the second piston 6.

In particular, the third chamber 11 is arranged downstream of the first chamber 9, with respect to the flow of the fluid, and is in fluid communication with the first chamber 9, so as to receive the fluid at high pressure.

The fourth chamber 12 is arranged upstream of the second chamber 10, with respect to the flow of the fluid and in fluid communication with the second chamber 10, so as to supply them with the homogenised fluid at low pressure.

Figure 1A:
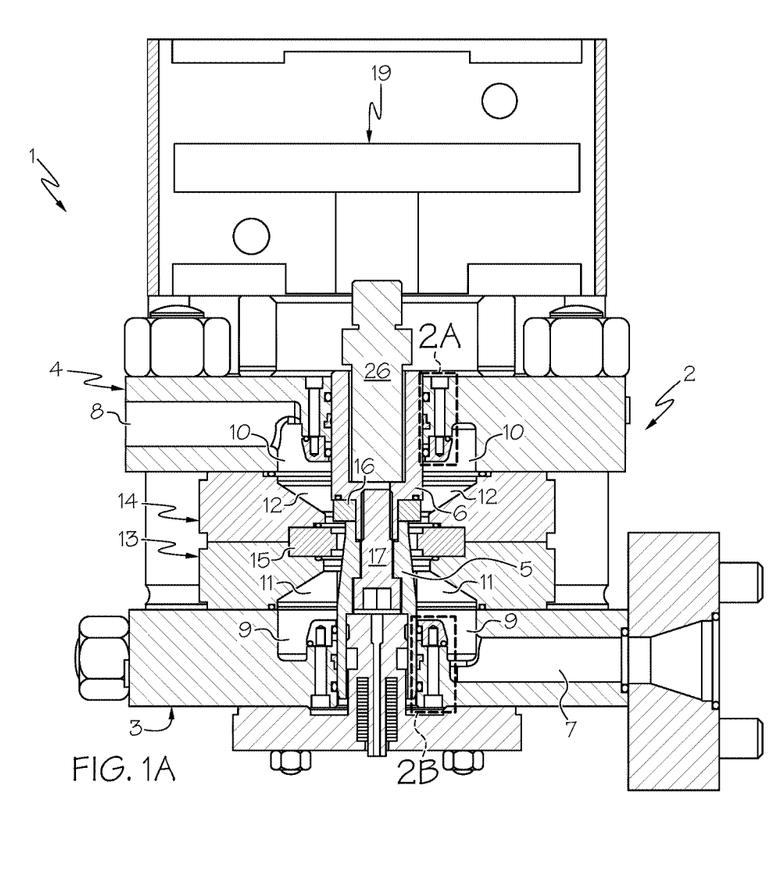
FIGS. 1a and 1b are two different embodiments of a homogenising valve, respectively with and without the locking element, according to the present invention, in a sectioned view.

In the embodiments described and shown here, the valve body 2 also comprises two intermediate valve bodies 13, 14, which are axially aligned and interposed between the inlet valve body 3 and the outlet valve body 4. As visible in FIGS. 1a-1b, the chambers 9, 10, 11, 12 are arranged in succession from the top to the bottom of valve 1, according to the sequence:
  first chamber 9;
  third chamber 11 above the first chamber 9;
  fourth chamber 12 above the third chamber 11;
  second chamber 10 above the fourth chamber 12.

The valve 1 comprises an annular passage head 15 interposed between the first chamber 9 and the second chamber 10. The passage head 15 is integrally joined to the valve body 2.

In the embodiment described and shown here, the passage head 15 is arranged and contained between the third chamber 11 and the fourth chamber 12.

The valve 1 comprises an annular striking head integrally coupled to the first piston 5 and to the second piston 6, so as to form an assembled organ 27. Said coupling is made by means of a screw 17, which is a part of the assembled organ 27. Preferably, the striking head 16 is also interposed between the first chamber 9 and the second chamber 10. In particular, the striking head 16 is at the fourth chamber 12.

Advantageously, the passage head 15 and/or the striking head 16 are realised at last partially in ceramic material. Preferably, the passage head 15 and/or the striking head 16 are fully realised in ceramic material. For example, the ceramic material used is zirconium oxide or sintered or hot-pressed silicon nitride.

As will be discussed below, this guarantees a greater resistance to wear, particularly in applications with abrasive fluids such as cellulose pulp.

The valve 1 is also provided with means of moving 19 the assembled organ 27 in an axial direction towards the passage head 15, so that the striking head 16 defines with the passage head 15 an interspace 18 of passage of the fluid from the first chamber 9 to the second chamber 10. In particular, movement of the assembled organ 27 towards the passage head 15 contrasts the pressure exerted by the fluid contained in the first chamber 9 (or in the third chamber 11, if present) on the striking head 16. In particular, the moving means 19 are operatively active on an extension 26 of the screw 17, which keeps together the assembled organ 27.

The moving means 19 of the assembled organ 27 are the known type and will not be described further.

Figure 5:
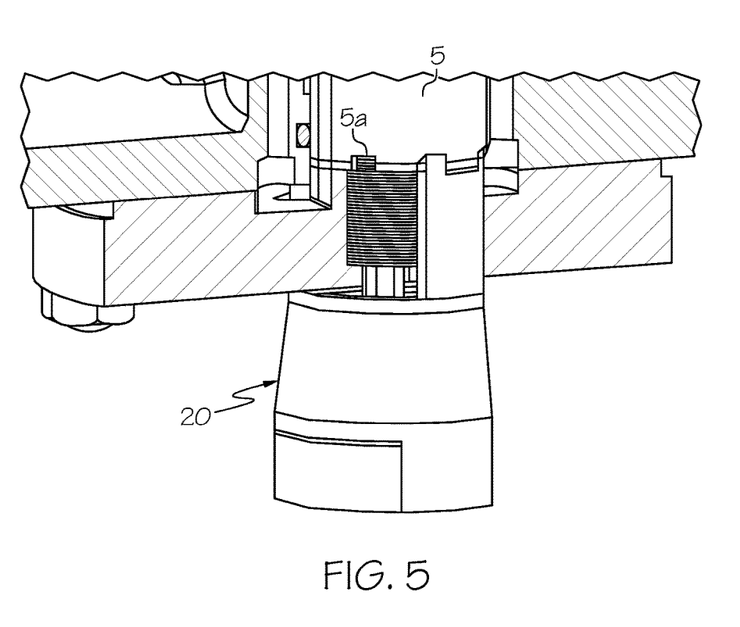
FIG. 5 shows a portion of the homogenising valve of FIG. 1a-1b to which a cogged tool is applied, in a perspective view.

Originally, the first piston 5 presents a free end 5a having a cogged profile suitable for engaging a cogged tool or apparatus 20, so as to place the assembled organ 27 in rotation. In particular, the cogged apparatus 20 presents a cogged profile counter-shaped with respect to the cogged profile of the free end 5a of the first piston 5, as may be clearly seen in FIG. 5.

Preferably, the first chamber 9 and the third chamber 11 define a composite volume tapered towards the interspace 18. Similarly, the fourth chamber 12 and the second chamber 10 define a composite volume tapered starting from the interspace 18. In other words, as visible from the FIGS. 1a-1b, the first chamber 9 and the third chamber 11 define an overturned funnel-shaped volume (which narrows towards the interspace 18), while the fourth chamber 12 and the second chamber 10 define a straight funnel-shaped volume (which widens from the interspace 18).

Figure 2A:
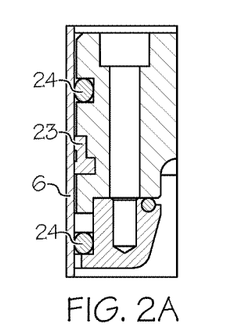
FIGS. 2a and 2b are enlargements of two different zones (guide means and sealing means) of the homogenising vale of FIGS. 1a-1b.
Figure 2B:
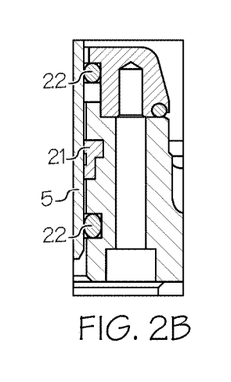

Preferably, the valve 1 is provided with at least a first annular guide element 21 housed in a first annular cavity interposed between the valve body 2 and the first piston 5, and at least a first annular gasket 22 housed in a second annular cavity interposed between the valve body 2 and the first piston 5 (see FIG. 2b).

Similarly, the valve 1 comprises at least a second annular guide element 23 housed in a third annular cavity interposed between the valve body 2 and the second piston 6, and at least a second annular gasket 24 housed in a fourth annular cavity interposed between the valve body 2 and the second piston 6 (see FIG. 2a).

The first and second guide elements 21, 23 form guide means of sliding of the assembled organ 27 in an axial direction, while the gaskets 22, 24 form sealing means.

In the embodiments described and illustrated here, the guide elements 21, 23 are "L"-shaped skates.

The gaskets 22, 24 are preferably O-rings of the known type.

Figure 1B:
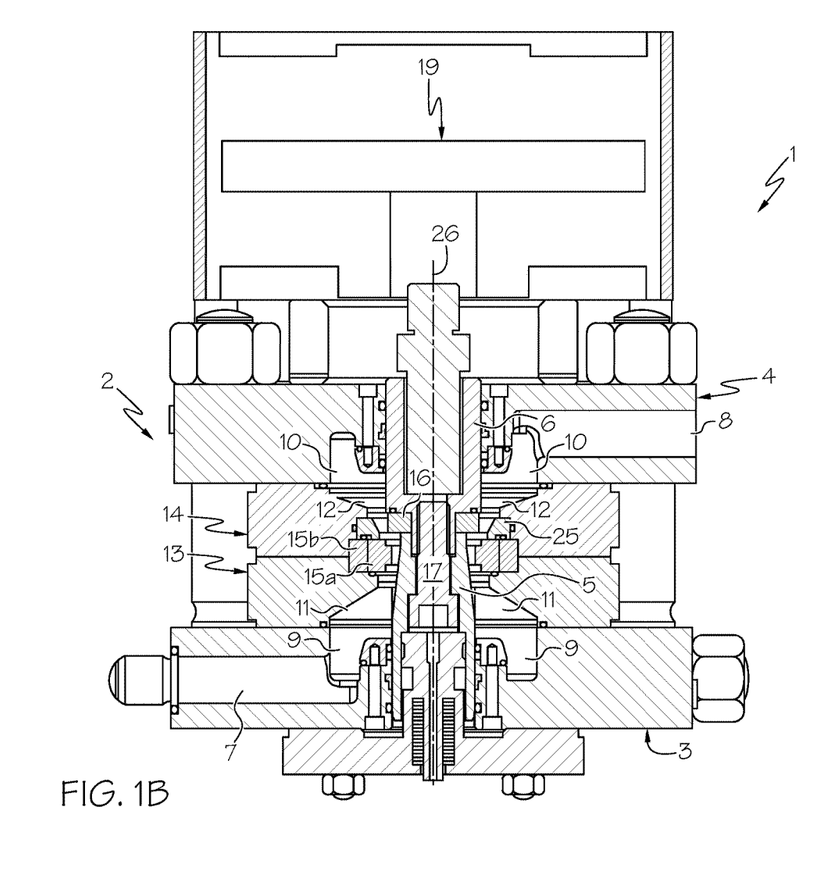
Figure 3A:
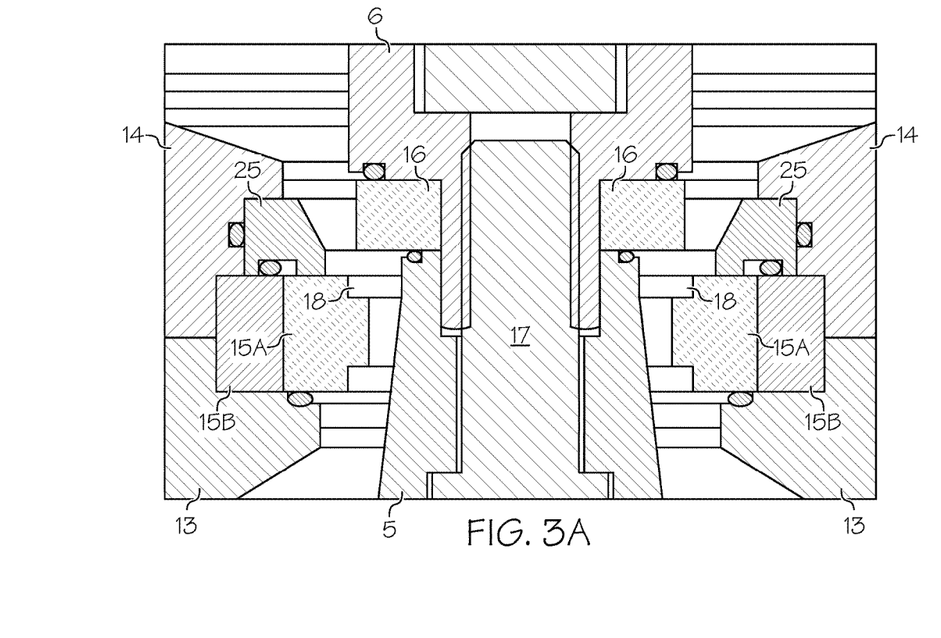
FIGS. 3a and 3b show an enlargement of the zone around the interspace of the homogenising valve of FIG. 1b, respectively during a rest phase and a functioning phase of said valve.
Figure 3B:
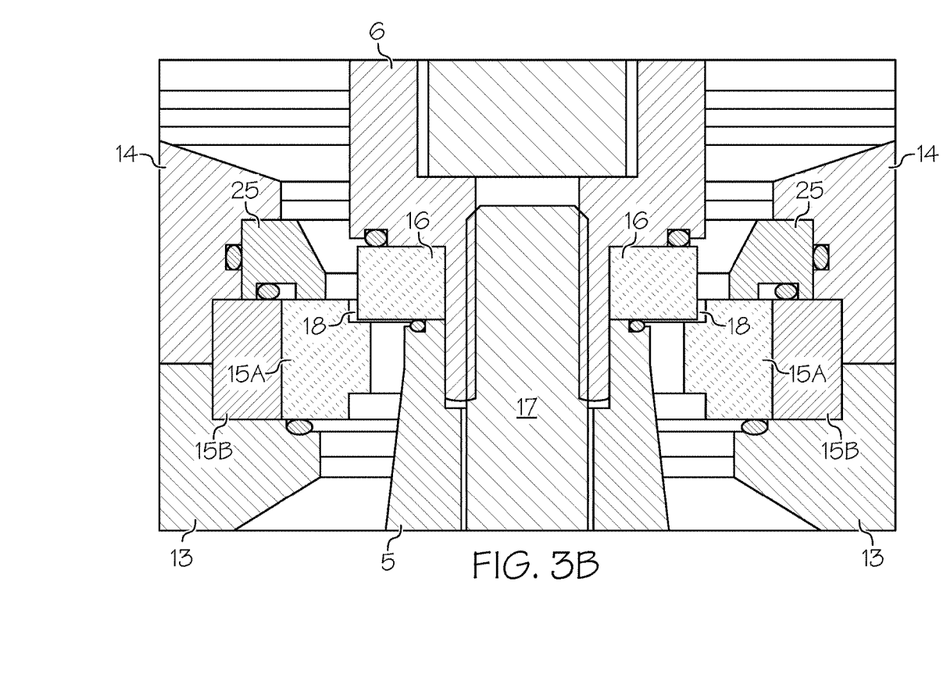
Figure 4:
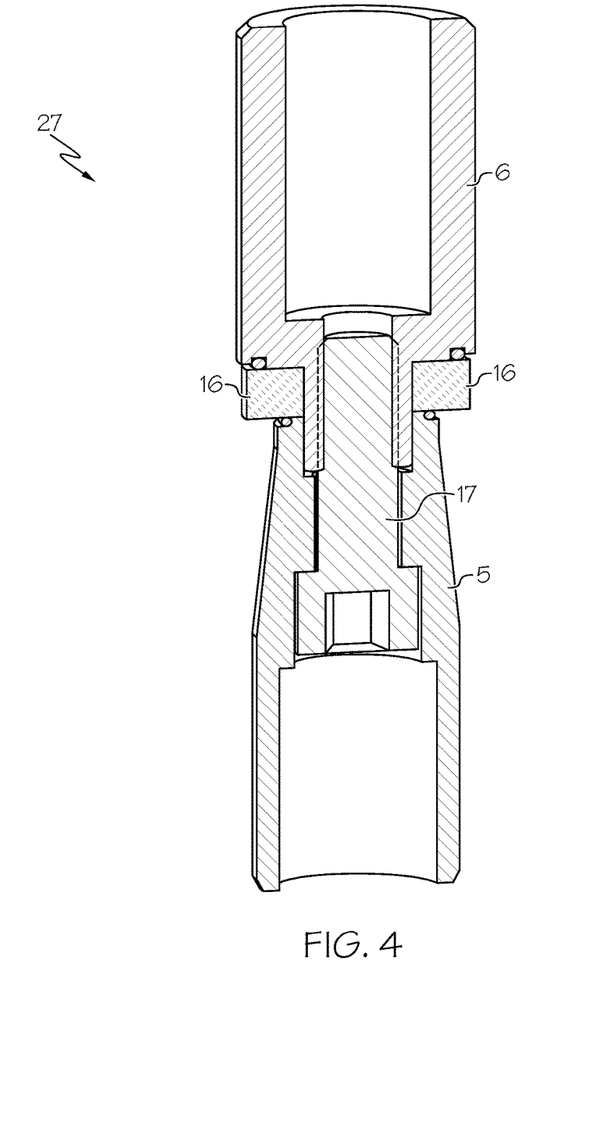
FIG. 4 shows a part (assembled organ) of the homogenising valve of FIG. 1a-1b, in a perspective and sectioned view.

In the embodiment shown in FIGS. 1b, 3a and 3b, the passage head 15 is formed of an inner annular block 15a made of ceramic material and by an outer annular block 15b made of steel.

In this case, the valve 1 also comprises a blocking element 25, interposed between the passage head 15 and the striking head 16, in order to prevent breakage and/or extraction of the inner block 15a with respect to the outer block 15b as a result of the high pressures involved. For example, the distance between the passage head 15 and the striking head 16 is around 7 mm and is determined by the length of the extension 26 of the screw 17. Preferably, the blocking element 25 is made of stainless steel, for example thermally treated AISI 630.

Functioning of the homogenising valve, according to the present invention, is briefly described below.

The fluid at high pressure, i.e. comprised indicatively between 250-700 bar approximately, enters into the valve 1 through the inlet 7 and reaches the first chamber 9 and the third chamber 11 downstream.

The fluid is submitted to a homogenisation process (or micronisation or removal of fibres), passing into the interspace 18 between the passage head 15 and the striking head 16. In particular, the gap between the passage head 15 and the striking head 16 is determined by the dynamic balance between the force exerted by the movement means 19 on the assembled organ 27 (and therefore on the striking head 16) towards the passage head 15 and the volumetric flow rate of the fluid coming from the first chamber 9 and from the third chamber 11, which presses on the striking head 16 and tends to distance it from the passage head 15.

In the passage between the interspace 18, the pressure of the fluid degrades from values between 250-700 bar to values lower than 100 bar.

Preferably, the interspace 18 has a shape of the known type. Reference is made, in particular, to the embodiments of the interspace described in Italian patent no. 1385953 in the name of the Applicant, incorporated here for reference.

The homogenised fluid then continues and collects in the fourth chamber 12 and in the second chamber 10 downstream, thus reaching the outlet 8 of the valve 1.

Periodically, it is possible to rotate the assembled organ 27 (and therefore the striking head 16) engaging the cogged tool or apparatus 20 with the cogged profile at the free end 5a of the first piston 5. Rotating the cogged tool 20 also causes the assembled organ 27 and therefore the striking head 16 to rotate, so that they are worn uniformly. Preferably, said operation is performed with the valve 1 stopped or not under pressure.

The characteristics of the homogenising valve, according to the present invention, are clear, as are the advantages.

In particular, the first piston is rotatable, due to the fact that its free end has a cogged profile suitable for engaging with a cogged tool or apparatus placed outside the valve. The striking head is thus also placed in rotation, allowing uniform wear and tear to be obtained and, consequently, increasing the useful lifetime.

Also to guarantee greater resistance to wear and tear and breakage (particularly in applications with abrasive products), the passage head and the striking head are made—partially or entirely—of ceramic material. In the embodiment of FIG. 1b (passage head with inner block in ceramic and outer block in steel), the presence of the blocking element is fundamental which, as it is made of material resistant to wear and tear but more elastic than ceramic (AISI 630), it prevents breakage of the ceramic of the inner block and/or extraction of the inner block with respect to the outer block of the passage head.

Furthermore, the axial symmetry of the valve allows the zone near the interspace to be made "reversible", i.e. to invert the arrangement of the passage head and the striking head. In particular, this occurs in solutions which do not provide the blocking element (see FIG. 1a). The possibility also exists of inverting arrangement of the "passage head-first chamber" with the "striking head-second chamber" block. In this manner, once a certain degree of wear and tear of the components subject to high pressure is reached (e.g. the passage head), they are inverted with the components subject to low pressure, making wear and tear uniform.

Furthermore, the arrangement of the third chamber downstream of the first chamber allows the portion at high pressure of the valve to be doubled, thus avoiding the direct impact of the fluid at high pressure with the first piston. This is even more advantageous if the first piston has a long and thin shape to satisfy specific pressure or flow rate requirements.

Furthermore, doubling the portions at high pressure (first and third chamber) and the portions at low pressure (second and fourth chamber) allows the valve to be disassembled more easily in the case of maintenance and/or replacement of components. This characteristic becomes practically essential in treatment of abrasive products (e.g. cellulose pulp), which cause considerable wear and tear on the components and therefore require more frequent maintenance and or replacement of components with respect to the known solutions.

The particular tapered configuration of the first chamber and the third chamber towards the interspace assist the flow of the fluid at high pressure. Tapering in the opposite direction of the fourth chamber and the second chamber, which must channel the homogenised fluid at low pressure towards the outlet, has the same function.

Due to the presence of skates housed in the corresponding annular cavities, wear and tear caused by sliding afflicts mainly the two pistons, which are easily replaceable cylindrical components. Said wear and tear is due mainly to the high operating pressures (up to approximately 700 bar) which cause considerable vibration of the assembled organ (first piston-second piston-third piston-striking head-screw), whereas the type of fluid plays a minor role.

It is precisely the high operating pressures which have made it necessary to separate the guide function from the sealing function (particularly for the portion at high pressure), so gaskets which are physically separate from the skates have been provided.

Since the gaskets are housed in corresponding annular cavities afforded in the valve body, the chambers are easily washable and therefore not subject to accumulations of solid agglomerates. This accumulation is extremely critical in the case of fibrous products (e.g. cellulose pulp), since it prevents sliding of the pistons.

The technical characteristics of the valve allow it to treat fibrous fluids, such as cellulose pulp, with pressures of around 250-700 bar rather than 1500 bar, thus saving energy and reducing wear and tear of the components, with the same yield of fibrous product.

The invention claimed is:

1. Homogenising valve (1) with axial symmetry for application to fibrous fluids, comprising:
    a valve body (2) defining a through hole having an axial direction with respect to the valve body (2);
    a first piston (5) housed in said through hole;
    a second piston (6) housed in said through hole and integrally coupled to said first piston (5);
    an inlet (7) for fluid at high pressure;
    an outlet (8) for homogenised fluid at low pressure;
    a first annular chamber (9) between said valve body (2) and said first piston (5), said inlet (7) being connected to said first annular chamber (9) to transfer to said first annular chamber (9) the fluid at high pressure;
    a second annular chamber (10) obtained between said valve body (2) and said second piston (6), said outlet (8) being connected to said second annular chamber (10) to receive from said second annular chamber (10) the fluid at low pressure;
a third annular chamber (11) afforded between said valve body (2) and said first piston (5), said third annular chamber (11) being arranged downstream of said first annular chamber (9) with respect to the flow of the fluid and being in fluid communication with said first annular chamber (9) so as to receive the fluid at high pressure;
an annular passage head (15) interposed between said first annular chamber (9) and said second annular chamber (10),
an annular striking head (16) integrally coupled to said first piston (5) and to said second piston (6) so as to form an assembled organ (27);
where said assembled organ (27) is movable in the axial direction towards the annular passage head (15) so that said annular striking head (16) defines with said annular passage head (15) an interspace (18) of passage of the fluid from said first annular chamber (9) to said second annular chamber (10),
characterised in that:
said first piston (5) presents a free end (5a) having a cogged profile suitable for engaging a cogged tool or apparatus (20) so as to place said assembled organ (27) in rotation,
wherein said first annular chamber (9) and said third annular chamber (11) define a composite volume tapered towards said interspace (18).

2. Homogenising valve (1) according to claim 1, further comprising: a fourth annular chamber (12) afforded between said first valve body (2) and said second piston (6), said fourth annular chamber (12) being arranged upstream of said second annular chamber (10) with respect to the flow of the fluid and being in fluid communication with said second annular chamber (10) so as to supply said second annular chamber (10) with the homogenised fluid at low pressure.

3. Homogenising valve (1) according to claim 2, wherein said fourth annular chamber (12) and said second annular chamber (10) define a composite volume tapered starting from said interspace (18).

4. Homogenising valve (1) according to claim 1, further comprising at least a first annular guide element (21) housed in a first annular cavity interposed between said valve body (2) and said first piston (5), and at least a first annular gasket (22) housed in a second annular cavity interposed between said valve body (2) and said first piston (5).

5. Homogenising valve (1) according to claim 4, further comprising at least a second annular guide element (23) housed in a third annular cavity interposed between said valve body (2) and said second piston (6), and at least a second annular gasket (24) housed in a fourth annular cavity interposed between said valve body (2) and said second piston (6), said at least first annular guide element (21) and said at least second annular guide element (23) allowing the assembled organ (27) to slide in the axial direction.

6. Homogenising valve (1) according to claim 1, wherein said annular passage head (15) and/or said annular striking head (16) are made at least partially of ceramic material.

7. Homogenising valve (1) according to claim 6, wherein said annular passage head (15) is formed of a radially inner annular block (15a) made of ceramic material and a radially outer annular block (15b) made of steel.

8. Homogenising valve (1) according to claim 7, further comprising a blocking element (25) interposed between said annular passage head (15) and said annular striking head (16) so as to prevent breakage and/or extraction of the inner annular block (15a) with respect to the outer annular block (15b) of the annular passage head (15).

9. Homogenising valve (1) according to claim 8, wherein said blocking element (25) is made of stainless steel.

* * * * *